United States Patent
Ibusuki et al.

(10) Patent No.: US 7,406,018 B2
(45) Date of Patent: Jul. 29, 2008

(54) SIGNAL GENERATING CIRCUIT AND OPTICAL PICKUP DEVICE PROVIDED THEREWITH

(75) Inventors: Ayumu Ibusuki, Kyoto (JP); Hiroyuki Funahashi, Kyoto (JP); Koji Nishikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 571 days.

(21) Appl. No.: 11/061,605

(22) Filed: Feb. 22, 2005

(65) Prior Publication Data

US 2005/0185525 A1      Aug. 25, 2005

(30) Foreign Application Priority Data

Feb. 23, 2004   (JP)   ............................ 2004-045735

(51) Int. Cl.
*G11B 7/00*   (2006.01)
(52) U.S. Cl. .................... 369/100; 369/44.29; 250/205; 250/214 LS
(58) Field of Classification Search ... 369/44.26–44.36, 369/44.4; 250/205
See application file for complete search history.

(56) References Cited

U.S. PATENT DOCUMENTS 5,981,936 A * 11/1999 Fujiie ..................... 250/214 A

FOREIGN PATENT DOCUMENTS

| JP | 57-164609 A | 10/1982 |
| JP | 64-050603 A | 2/1989 |
| JP | 04-354408 A | 12/1992 |
| JP | 04354408 A * | 12/1992 |
| JP | 09-098033 | 4/1997 |
| JP | 09-252224 A | 9/1997 |

* cited by examiner

*Primary Examiner*—Tan X Dinh
(74) *Attorney, Agent, or Firm*—Arent Fox LLP

(57) ABSTRACT

A signal generating circuit of the invention includes a current polarity switch circuit that receives an output current of a light-sensitive element and outputs a current of which the direction the polarity switch circuit keeps constant regardless of the direction of the received current, a current-to-voltage conversion circuit that converts the current outputted from the current polarity switch circuit into a voltage, and a signal processing circuit that receives the voltage outputted from the current-voltage conversion circuit to generate a signal based on the received voltage. Thus, the signal based on the received current signal can be generated regardless of the direction of the received current signal.

3 Claims, 4 Drawing Sheets

SIGNAL GENERATING CIRCUIT AND OPTICAL PICKUP DEVICE PROVIDED THEREWITH

This application is based on Japanese Patent Application No. 2004-45735 filed on Feb. 23, 2004, the contents of which are hereby incorporated by reference.

BACKGROUND OF THE INVENTION

1. Field of the Invention

The present invention relates to a signal generating circuit that receives a current signal to generate a signal based on the current signal. The present invention also relates to an optical pickup device provided with such a signal generating circuit.

2. Description of Related Art

An optical pickup device includes a signal generating circuit. The signal generating circuit receives the output current of a light-sensitive element that receives light reflected from an optical disk, and then generates a servo error signal based on the current signal.

In an optical pickup device incorporated in a CD playback apparatus or the like, the anode of a photodiode used as a light-sensitive element is grounded so as to increase the sensitivity of the light-sensitive element to light of long wavelengths (e.g. red light). FIG. 6 shows an example of the configuration of a signal generating circuit that receives an output current of a photodiode having the anode thereof grounded and generates a servo error signal.

The signal generating circuit 11 shown in FIG. 6 includes an operational amplifier 12, a resistor 13, and a signal processing circuit 14. The signal generating circuit 11 shown in FIG. 6 receives a current outputted from a photodiode 15 whose anode is grounded. The output current of the photodiode 15 is converted into a voltage by a current-to-voltage converter formed by the operational amplifier 12 and the resistor 13. The signal processing circuit 14 receives the voltage outputted from the current-to-voltage converter, and then generates a servo error signal based on the received voltage.

On the other hand, in recent years, much effort has been spent in the development of DVD playback apparatuses and the like that use blue laser light. In an optical device incorporated in such apparatuses, a constant voltage Vcc is fed to the cathode of a photodiode used as a light-sensitive element so as to increase the sensitivity of the light-sensitive element to light of short wavelengths. FIG. 7 shows an example of the configuration of a signal generating circuit that receives an output current of a photodiode receiving a constant Vcc at the cathode thereof and generates a servo error signal. In FIG. 7, such components as find their counterparts in FIG. 6 are identified with common reference numerals.

The signal generating circuit 16 shown in FIG. 7 includes an operational amplifier 12, a resistor 13, and a signal processing circuit 17. The signal generating circuit 16 shown in FIG. 7 receives a current outputted from a photodiode 18 that receives a constant Vcc at the cathode thereof. The output current of the photodiode 18 is converted into a voltage by a current-to-voltage converter formed by the operational amplifier 12 and the resistor 13. The signal processing circuit 17 receives the voltage outputted from the current-to-voltage converter, and then generates a servo error signal based on the received voltage.

The signal generating circuit 11 shown in FIG. 6 and the signal generating circuit 16 shown in FIG. 7 differ from each other in the polarity of the input current, and accordingly in the polarity of the voltage outputted from the current-to-voltage converter formed by the operational amplifier 12 and the resistor 13. This gives the signal processing circuit 14 and the signal processing circuit 17 different circuit configurations.

As a result, whereas the signal generating circuit 11 shown in FIG. 6 cannot process the output current of a photodiode that receives a constant voltage at the cathode thereof, the signal generating circuit 16 shown in FIG. 7 cannot process the output current of a photodiode whose anode is grounded. That is, quite inconveniently, which type of signal generating circuit to use needs to be decided according to how a photodiode is connected.

SUMMARY OF THE INVENTION

An object of the present invention is to provide a signal generating circuit capable of generating a signal based on a current signal fed thereto regardless of the direction of the current signal, and to provide an optical pickup device provided with such a signal generating circuit.

To achieve the above object, in one aspect of the present invention, a signal generating circuit is provided with: a current polarity switch circuit that receives a current and outputs a current whose direction the current polarity switch circuit keeps constant regardless of the direction of the current received; a current-to-voltage conversion circuit that converts the current outputted from the current polarity switch circuit into a voltage; and a signal processing circuit that receives the voltage outputted from the current-to-voltage conversion circuit to generate a signal based on the voltage received.

With this configuration, it is possible to keep constant the polarity of the voltage fed to the signal processing circuit regardless of the direction of the current fed to the signal generating circuit. This allows the signal based on the current fed to the signal generating circuit to be generated regardless of the direction of the current fed to the signal generating circuit.

The current polarity switch circuit may be provided with: an input terminal; a first current mirror circuit built as a current mirror circuit of the type that sweeps out a current; a second current mirror circuit built as a current mirror circuit of the type that draws in a current; an NPN-type transistor whose emitter is connected to the input terminal and whose collector is connected to the input end of the first current mirror circuit; a PNP-type transistor whose emitter is connected to the input terminal and whose collector is connected to the output end of the first current mirror circuit and to the input end of the second current mirror circuit; an output terminal connected to the output end of the second current mirror circuit; and a bias voltage feeder that, when no current is being fed in via the input terminal, feeds to the bases of the NPN-type and PNP-type transistors a bias voltage sufficient to turn off the NPN-type and PNP-type transistors.

With this configuration, the NPN-type transistor and the PNP-type transistor are automatically turned on and off according to the direction of the current fed in via the input terminal of the current polarity switch circuit, thereby keeping constant the diction of the current outputted from the current polarity switch circuit. This eliminates the need to use an external control signal to determine whether or not to change the current direction.

In another aspect of the present invention, an optical pickup device is provided with a light-sensitive element and a signal generating circuit that generates a signal based on the output current of the light-sensitive element. Here, the signal generating circuit is configured just like the above-described signal generating circuit according to the present invention.

With this configuration, the signal (e.g. a servo error signal) based on the output current of the light-sensitive element can be generated regardless of the direction of the output current of the light-sensitive element.

DETAILED DESCRIPTION OF PREFERRED EMBODIMENTS

Figure 1:
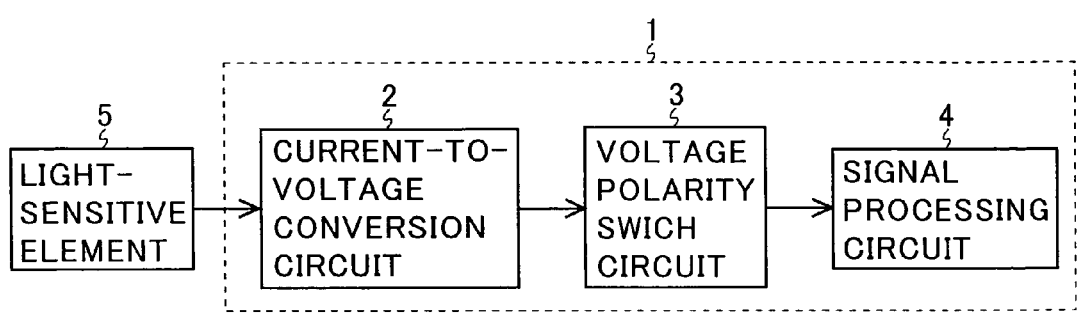
FIG. 1 is a diagram showing an example of the configuration of a signal generating circuit according to the present invention.

Hereinafter, embodiments of the present invention will be described with reference to the accompanying drawings. FIG. 1 shows an example of the configuration of a signal generating circuit according to the present invention. The signal generating circuit 1 shown in FIG. 1 includes a current-to-voltage conversion circuit 2, a voltage polarity switch circuit 3, and a signal processing circuit 4.

A light-sensitive element 5 converts the light it receives into a current, and then outputs the current to the signal generating circuit 1. The current-to-voltage conversion circuit 2 receives the output current of the light-sensitive element 5, then converts the received current into a voltage, and then delivers the resulting voltage to the voltage polarity switch circuit 3. The current-to-voltage conversion circuit 2 is built, for example, with a resistor and an operational amplifier that receives a predetermined voltage at the non-inverting input terminal thereof and of which the inverting input terminal and the output terminal are connected together through the resistor.

The voltage polarity switch circuit 3 receives the voltage outputted from the current-to-voltage conversion circuit 2, and then outputs the received voltage either intact or after inverting it, according to an external control signal. In this embodiment, when the output current of the light-sensitive element 5 flows into the signal generating circuit 1, the external control signal is such that the voltage polarity switch circuit 3 is instructed to output the voltage after inverting it; when the output current of the light-sensitive element 5 flows out of the signal generating circuit 1, the external control signal is such that the voltage polarity switch circuit 3 is instructed to output the voltage intact.

The signal processing circuit 4 receives the voltage outputted from the voltage polarity switch circuit 3, and generates a servo error signal based on the received voltage.

With the signal generating circuit 1 configured as described above, the polarity of the voltage fed to the signal processing circuit 4 is kept constant regardless of the direction of the output current of the light-sensitive element 5. This allows the servo error signal to be generated based on the output current of the light-sensitive element 5 regardless of the direction of this current.

Figure 2:
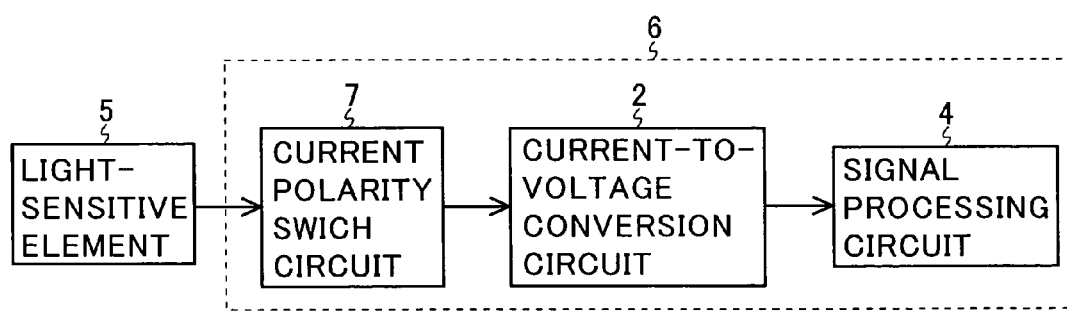
FIG. 2 is a diagram showing another example of the configuration of a signal generating circuit according to the present invention.

FIG. 2 shows another example of the configuration of a signal generating circuit according to the present invention. In FIG. 2, such circuit blocks as are found also in FIG. 1 are identified with common reference numerals. The signal generating circuit 6 shown in FIG. 2 includes a current polarity switch circuit 7, a current-to-voltage conversion circuit 2, and a signal processing circuit 4.

A light-sensitive element 5 converts the light it receives into a current, and then outputs the current to the signal generating circuit 6. The current polarity switch circuit 7 receives the output current of the light-sensitive element 5, and then outputs the received current either without changing or after changing the direction thereof. In this embodiment, when the output current of the light-receiving element 5 flows into the signal generating circuit 6, the current polarity switch circuit 7 changes the current direction; when the output current of the light-sensitive element 5 flows out of the signal generating circuit 6, the current polarity switch circuit 7 does not change the current direction.

The current-to-voltage conversion circuit 2 receives the output current of the current polarity switch circuit 7, then converts the received current into a voltage, and then delivers the resulting voltage to the signal processing circuit 4. The current-to-voltage conversion circuit 2 is built, for example, with a resistor and an operational amplifier that receives a predetermined voltage at the non-inverting input terminal thereof and of which the inverting input terminal and the output terminal are connected together through the resistor.

The signal processing circuit 4 receives the voltage outputted from the current-to-voltage conversion circuit 2, and generates a servo error signal based on the received voltage.

With the signal generating circuit 6 configured as described above, the polarity of the voltage fed to the signal processing circuit 4 is kept constant regardless of the direction of the output current of the light-sensitive element 5. This allows the servo error signal to be generated based on the output current of the light-sensitive element 5 regardless of the direction of this current.

Figure 3:
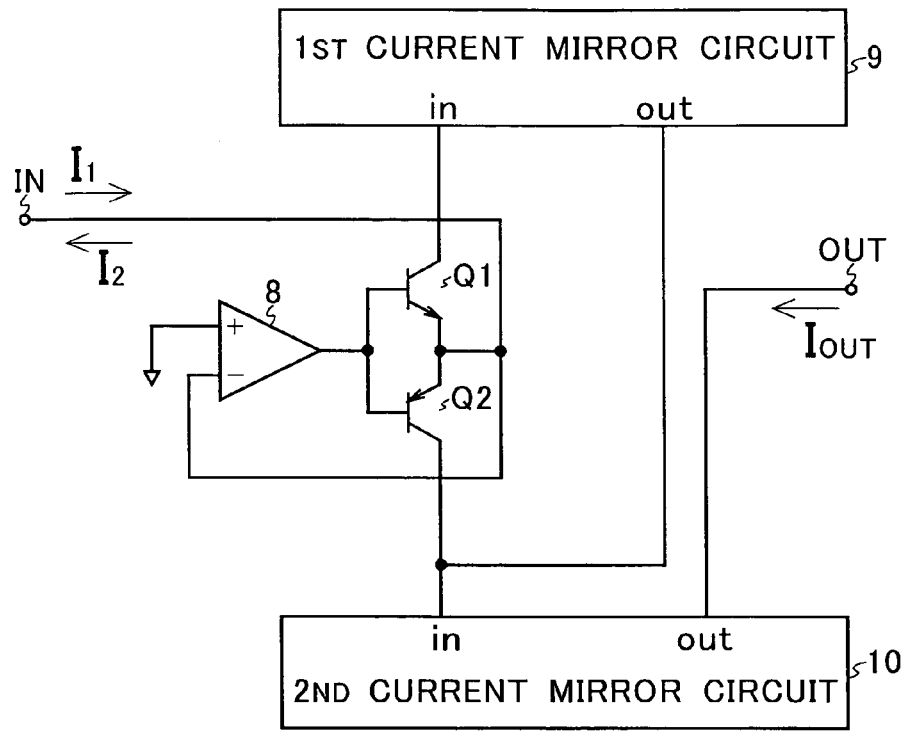
FIG. 3 is a diagram showing an example of the configuration of the current polarity switch circuit included in the signal generating circuit of FIG. 2.

FIG. 3 shows an example of the configuration of the current polarity switch circuit 7. The current polarity switch circuit 7 shown in FIG. 3 includes an input terminal IN, a NPN-type transistor Q1, a PNP-type transistor Q2, an operational amplifier 8, a first current mirror circuit 9, a second current mirror circuit 10, and an output terminal OUT.

Figure 4A:
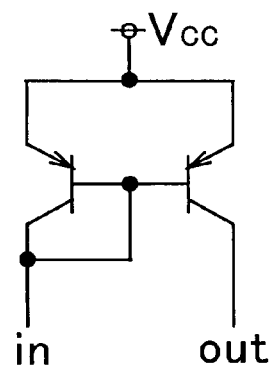
FIGS. 4A to 4D are diagrams showing examples of the configuration of the current mirror circuits included in the current polarity switch circuit of FIG. 3.
Figure 4B:
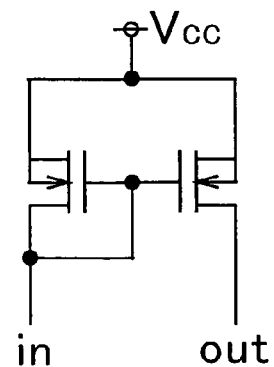
Figure 4C:
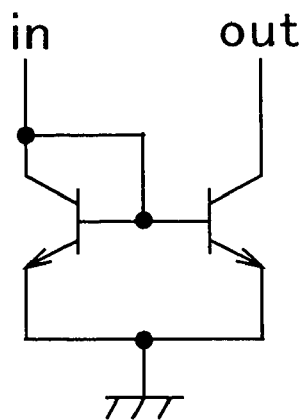
Figure 4D:
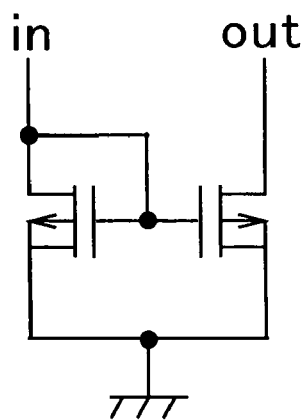

The input terminal IN, via which the output current of the light-receiving element 5 is fed in, is connected to the emitter of the transistor Q1, to the emitter of the transistor Q2, and to the inverting input terminal of the operational amplifier 8. The output terminal of the operational amplifier 8 is connected to the bases of the transistors Q1 and Q2. The collector of the transistor Q1 is connected to the input end of the first current mirror circuit 9. The output end of the first current mirror circuit 9 and the collector of the transistor Q2 are connected to the input end of the second current mirror circuit 10. The output end of the second current mirror circuit 10 is connected to the output terminal OUT. The first current mirror circuit 9 is built as a current mirror circuit of the type that sweeps out a current (for example, configured as shown in FIG. 4A or 4B). The second current mirror circuit 10 is built as a current mirror circuit of the type that draws in a current (for example, configured as shown in FIG. 4C or 4D).

When no output current is being fed in from the light-sensitive element 5, the operational amplifier 8 feeds to the bases of the transistors Q1 and Q2 a bias voltage sufficient to turn the transistors Q1 and Q2 off.

When the output current of the light-sensitive element 5 flows into the current polarity switch circuit as indicated by I$_1$ in FIG. 3, the transistor Q1 turns off and the transistor Q2 turns on. This causes the output current of the light-sensitive element 5 to be fed via the input terminal IN and the transistor Q2 to the input end of the second current mirror circuit 10. Fed with this current, the second current mirror circuit 10 draws in a current via the output end thereof, so that a current I$_{OUT}$ that flows into the current polarity switch circuit is fed out via the output terminal OUT.

By contrast, when the output current of the light-sensitive element 5 flows out of the current polarity switch circuit as indicated by I$_2$ in FIG. 3, the transistor Q1 turns on and the transistor Q2 turns off. This causes the output current of the light-sensitive element 5 to be fed via the input terminal IN and the transistor Q1 to the input end of the first current mirror circuit 9. Fed with this current, the first current mirror circuit 9 sweeps out a current via the output end thereof. The current thus swept out is then fed to the input end of the second current mirror circuit 10. This causes the second current mirror circuit 10 to draw in a current via the output end thereof, so that a current I$_{OUT}$ that flows into the current polarity switch circuit is fed out via the output terminal OUT.

With the current polarity switch circuit 7 configured as shown in FIG. 3, the transistors Q1 and Q2 are automatically turned on and off according to the direction of the output current of the light-sensitive element 5 so that the direction of the current outputted from the current polarity switch circuit 7 is kept constant. This eliminates the need to use an external control signal to determine whether or not to change the current direction.

Alternatively, the current polarity switch circuit 7 may be built with a current mirror circuit and a switch that determines, according to an external control signal, whether or not to output a current via this current mirror circuit. In this embodiment, the current mirror circuit is built as a current mirror circuit of the type that draws in a current into it. When the output current of the light-sensitive element 5 flows into the signal generating circuit 6, the external control signal is such that the switch is instructed to output the received current via the current mirror circuit; when the output current of the light-sensitive element 5 flows out of the signal generating circuit 6, the external control signal is such that the switch is instructed to output the received current directly without passing it through the current mirror circuit. This configuration, however, requires the use of an external control signal, making it preferable to adopt the configuration shown in FIG. 3.

Figure 5:
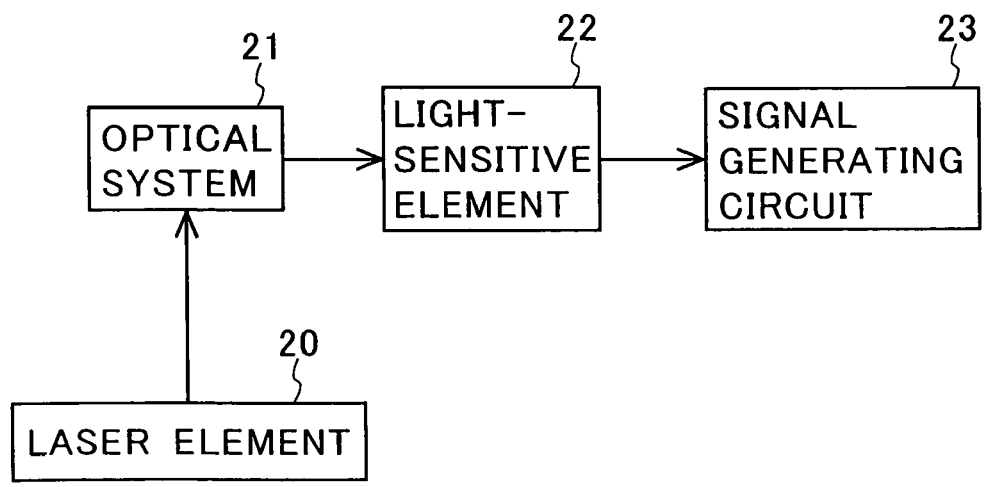
FIG. 5 is a diagram showing an example of the configuration of an optical pickup device according to the present invention.
Figure 6:
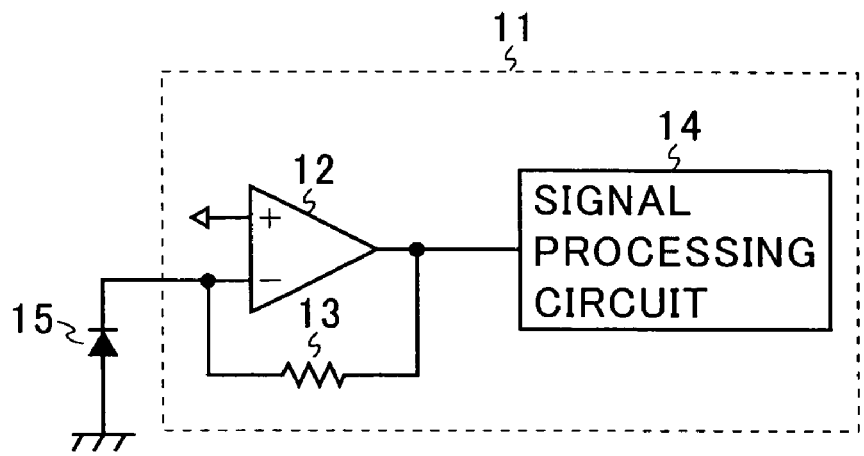
FIG. 6 is a diagram showing an example of the configuration of a conventional signal generating circuit.
Figure 7:
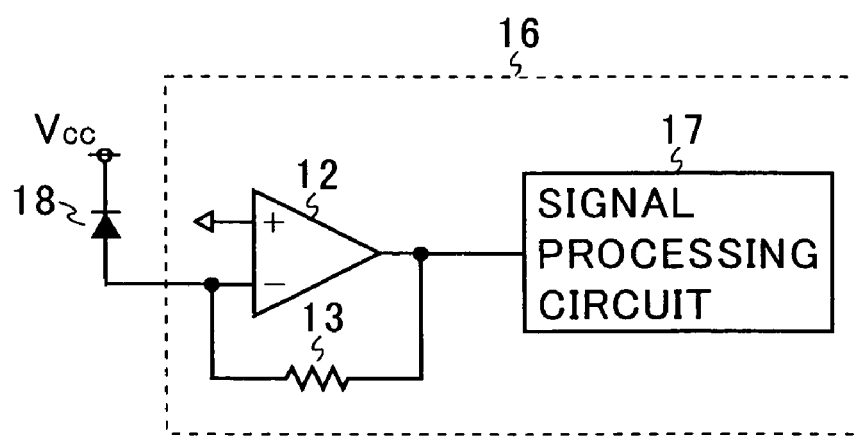
FIG. 7 is a diagram showing another example of the configuration of a conventional signal generating circuit.

The above-described signal generating circuit according to the present invention finds application in, for example, optical pickup devices. As shown in FIG. 5, an optical pickup device then includes: a laser element 20 that emits a laser beam; an optical system 21 that converges the laser beam on a disk and that directs the light reflected from the disk to a light-sensitive element 22; the light-sensitive element 22 that receives the light reflected from the disk; and a signal generating circuit 23 just like the one according to the present invention (see FIGS. 1 and 2) that generates a servo error signal based on the output current of the light-sensitive element 22.

What is claimed is:

1. A signal generating circuit comprising:
   a current polarity switch circuit that receives a current and outputs a current of a fixed direction regardless of a direction of the current received;
   a current-to-voltage conversion circuit that converts the current outputted from the current polarity switch circuit into a voltage; and
   a signal processing circuit that receives the voltage outputted from the current-to-voltage conversion circuit to generate a signal based on the voltage received,
   wherein the current polarity switch circuit comprises:
   an input terminal;
   a first current mirror circuit built as a current mirror circuit of a type that sweeps out a current;
   a second current mirror circuit built as a current mirror circuit of a type that draws in a current;
   an NPN-type transistor whose emitter is connected to the input terminal and whose collector is connected to an input end of the first current mirror circuit;
   a PNP-type transistor whose emitter is connected to the input terminal and whose collector is directly connected to an output end of the first current mirror circuit and to an input end of the second current mirror circuit;
   an output terminal connected to an output end of the second current mirror circuit; and
   a bias voltage feeder that, when no current is being fed in via the input terminal, feeds to bases of the NPN-type and PNP-type transistors a bias voltage sufficient to turn off the NPN-type and PNP-type transistors.

2. An optical pickup device comprising:
   a light-sensitive element; and
   a signal generating circuit that generates a signal based on an output current of the light-sensitive element,
   wherein the signal generating circuit comprises:
   a current polarity switch circuit that receives a current and outputs a current of a fixed direction regardless of a direction of the current received;
   a current-to-voltage conversion circuit that converts the current outputted from the current polarity switch circuit into a voltage; and
   a signal processing circuit that receives the voltage outputted from the current-to-voltage conversion circuit to generate a signal based on the voltage received,
   wherein the current polarity switch circuit comprises:
   an input terminal;
   a first current mirror circuit built as a current mirror circuit of a type that sweeps out a current;
   a second current mirror circuit built as a current mirror circuit of a type that draws in a current;
   an NPN-type transistor whose emitter is connected to the input terminal and whose collector is connected to an input end of the first current mirror circuit;
   a PNP-type transistor whose emitter is connected to the input terminal and whose collector is directly connected to an output end of the first current mirror circuit and to an input end of the second current mirror circuit;
   an output terminal connected to an output end of the second current mirror circuit; and
   a bias voltage feeder that, when no current is being fed in via the input terminal, feeds to bases of the NPN-type and PNP-type transistors a bias voltage sufficient to turn off the NPN-type and PNP-type transistors.

3. The optical pickup device of claim 2, wherein the signal generated by the signal generating circuit is a servo error signal.

* * * * *